(12) United States Patent
Rencs et al.

(10) Patent No.: US 9,959,208 B2
(45) Date of Patent: May 1, 2018

(54) PARALLEL CACHING ARCHITECTURE AND METHODS FOR BLOCK-BASED DATA PROCESSING

(71) Applicant: Goodrich Corporation, Charlotte, NC (US)

(72) Inventors: Erik V. Rencs, Carlisle, MA (US); Scott W. Ramsey, Northbridge, MA (US)

(73) Assignee: Goodrich Corporation, Charlotte, NC (US)

( * ) Notice: Subject to any disclaimer, the term of this patent is extended or adjusted under 35 U.S.C. 154(b) by 71 days.

(21) Appl. No.: 14/728,973

(22) Filed: Jun. 2, 2015

(65) Prior Publication Data

US 2016/0357668 A1 Dec. 8, 2016

(51) Int. Cl.
| | |
|---|---|
| *G09G 5/39* | (2006.01) |
| *G06F 12/084* | (2016.01) |
| *G06F 9/46* | (2006.01) |
| *G06F 9/48* | (2006.01) |
| *G06F 3/06* | (2006.01) |

(Continued)

(52) U.S. Cl.
CPC ............ *G06F 12/084* (2013.01); *G06F 3/064* (2013.01); *G06F 3/0604* (2013.01); *G06F 3/0673* (2013.01); *G06F 9/462* (2013.01); *G06F 9/4887* (2013.01); *G06F 12/0842* (2013.01); *G06F 12/0875* (2013.01); *G06F 2212/60* (2013.01); *Y02B 60/144* (2013.01)

(58) Field of Classification Search
CPC .............................. G01C 21/165; G06F 15/76
See application file for complete search history.

(56) References Cited

U.S. PATENT DOCUMENTS

2002/0116595 A1 8/2002 Morton
2003/0142101 A1 7/2003 Lavelle et al.
(Continued)

OTHER PUBLICATIONS

Meijer et al., "Multiple View Camera Calibration for Localization", article, Sep. 1, 2007, 7 pages, First ACM/IEEE Conference on Distributed Smart Cameras, ICDSC, Vienna, Austria URL: http://www.seeingwithsound.com/thesis/icdsc07_meijer_etal.pdf.*

(Continued)

*Primary Examiner* — Thomas Lett
(74) *Attorney, Agent, or Firm* — Locke Lord LLP; Scott D. Wofsy; Alexander Viderman

(57) ABSTRACT

A multi-processor computer system with shared memory resources includes a first plurality of sensors configured to acquire inertial and positional data related to a mobile platform. The system further includes a first plurality of co-processors having a hardware logic configured to control the acquisition of the inertial and positional data and configured to analyze the acquired data. The system also includes a second plurality of sensors configured to acquire input data related to the mobile platform connected to a second plurality of co-processors having a hardware logic configured to receive a plurality of streams of input data from the second plurality of sensors and configured to segment the input data into a plurality of discrete data segments. The system also includes a plurality of hardware processing units configured to perform calculations related to the input data using the plurality of data segments.

12 Claims, 7 Drawing Sheets

(51) Int. Cl.
*G06F 12/0842* (2016.01)
*G06F 12/0875* (2016.01)

(56) References Cited

U.S. PATENT DOCUMENTS

| | | | |
|---|---|---|---|
| 2004/0019743 A1 | 1/2004 | Au et al. | |
| 2005/0029458 A1* | 2/2005 | Geng | G08B 13/19608 |
| | | | 250/347 |
| 2007/0083730 A1 | 4/2007 | Vorbach et al. | |
| 2008/0320277 A1 | 12/2008 | Fish, III | |
| 2009/0066641 A1 | 3/2009 | Mahajan et al. | |
| 2009/0319183 A1* | 12/2009 | Lee | G01C 21/30 |
| | | | 701/533 |
| 2010/0042322 A1* | 2/2010 | Won | G01C 21/165 |
| | | | 701/469 |
| 2010/0287161 A1 | 11/2010 | Naqvi | |
| 2012/0136573 A1* | 5/2012 | Janardhanan | G01C 21/165 |
| | | | 701/512 |
| 2013/0090881 A1* | 4/2013 | Janardhanan | G01C 22/006 |
| | | | 702/104 |
| 2014/0361905 A1 | 12/2014 | Sadasivam et al. | |
| 2016/0156855 A1* | 6/2016 | Boulanger | G06T 1/20 |
| | | | 348/164 |

OTHER PUBLICATIONS

Nurpinar Akdeniz, "Digital Signal Processor (DSP) Accelerated Image Enhancement for Infrared Imaging Systems", Master's Thesis, Jul. 1, 2011, 63 pages, Atilim University, Ankara, Turkey URL: http://acikarsiv.atilim.edu.tr/browse/402/410968.pdf.*
Extended European Search Report from the European Patent Office dated Oct. 19, 2016 for Application No. EP16172708.
"Apple M7", Wikipedia, Feb. 3, 2014 (Feb. 3, 2014), XP002762634, Retrieved from the Internet: URL: https: //web.archive.org/web/20140203180041/http://de.wikipedia.org/wiki/Apple_M7 [retrieved on Sep. 29, 2016] * the whole document *.
"Apple iPhone 5s", Wikipedia, Apr. 25, 2014 (Apr. 25, 2014), XP002762635, Retrieved from the Internet: URL: https: //web.archive.org/web/20140425065439/http://de.wikipedia.org/wiki/IPhone_5s [retrieved on Sep. 29, 2016] * the whole document *.

* cited by examiner

PARALLEL CACHING ARCHITECTURE AND METHODS FOR BLOCK-BASED DATA PROCESSING

FIELD OF THE INVENTION

The present invention relates to data caching schemes, and more particularly, to parallel caching architecture and methods for block-based data processing.

BACKGROUND OF THE INVENTION

A cache memory is a limited size fast memory, which stores blocks of data, known as lines, that reflect selected main memory locations. A cache memory is smaller than the main memory it reflects, which means the cache memory typically is not fully addressable and must store a tag field for each data line. The tag field identifies the main memory address corresponding to a particular data line. Data caching systems are typically used by various processing devices to minimize access time to an external main memory device, such as a multi-bank double data rate (DDR) dynamic random access memory (DRAM). The reduced access time and the locality of program and data accesses allow cache operations to increase performance of a multi-processor system. A cache is typically a single structure of RAM, allocated within the processing device. From another perspective, a cache improves parallel processing performance by increasing independence of a processor from main memory.

Machine vision systems for intelligent mobile platforms have been proposed in the past as a possible mechanism for object avoidance. At least in some cases, the mobile platforms consist of a computing engine, a plurality of physical sensors (i.e., gyroscopes, accelerometers, Global Positioning System (GPS) devices) and sensors that can form images (i.e., camera, lidar (light detection and ranging) sensors, etc.). Additionally, these mobile systems can have a plurality of electro-mechanical actuators that need to be controlled and may run one or more machine vision applications on the computing engine of the mobile platform. Typical applications include data processing, image processing, audio processing and data communications. A particular application involves the processing of live, streaming data, such as a stream of digital images or video. When processing live, streaming data, a memory is often needed to accumulate sufficient data prior to performing an operation.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a multi-processor computer system with shared memory resources includes a first plurality of sensors configured to acquire inertial and positional data related to a mobile platform. The computer system further includes a first plurality of co-processors communicatively coupled to the first plurality of sensors. The first plurality of co-processors includes a hardware logic configured to control the acquisition of the inertial and positional data and configured to analyze the acquired inertial and positional data. The multi-processor system also includes a second plurality of sensors configured to acquire input data related to the mobile platform. The system also includes a second plurality of co-processors communicatively coupled to the second plurality of sensors. The second plurality of co-processors including a hardware logic configured to receive a plurality of streams of input data from the second plurality of sensors and configured to segment the input data into a plurality of discrete data segments. Each data segment includes an element of input data stream and a subset of the inertial and positional data related to the element of input data stream. The system also includes a plurality of hardware processing units configured to perform calculations related to the input data using the plurality of data segments.

BRIEF DESCRIPTION OF THE DRAWINGS

So that those having ordinary skill in the art, to which the present invention pertains, will more readily understand how to employ the novel system and methods of the present certain illustrated embodiments, the embodiments thereof will be described in detail herein-below with reference to the drawings, wherein.

DETAILED DESCRIPTION OF CERTAIN EMBODIMENTS

Figure 1:
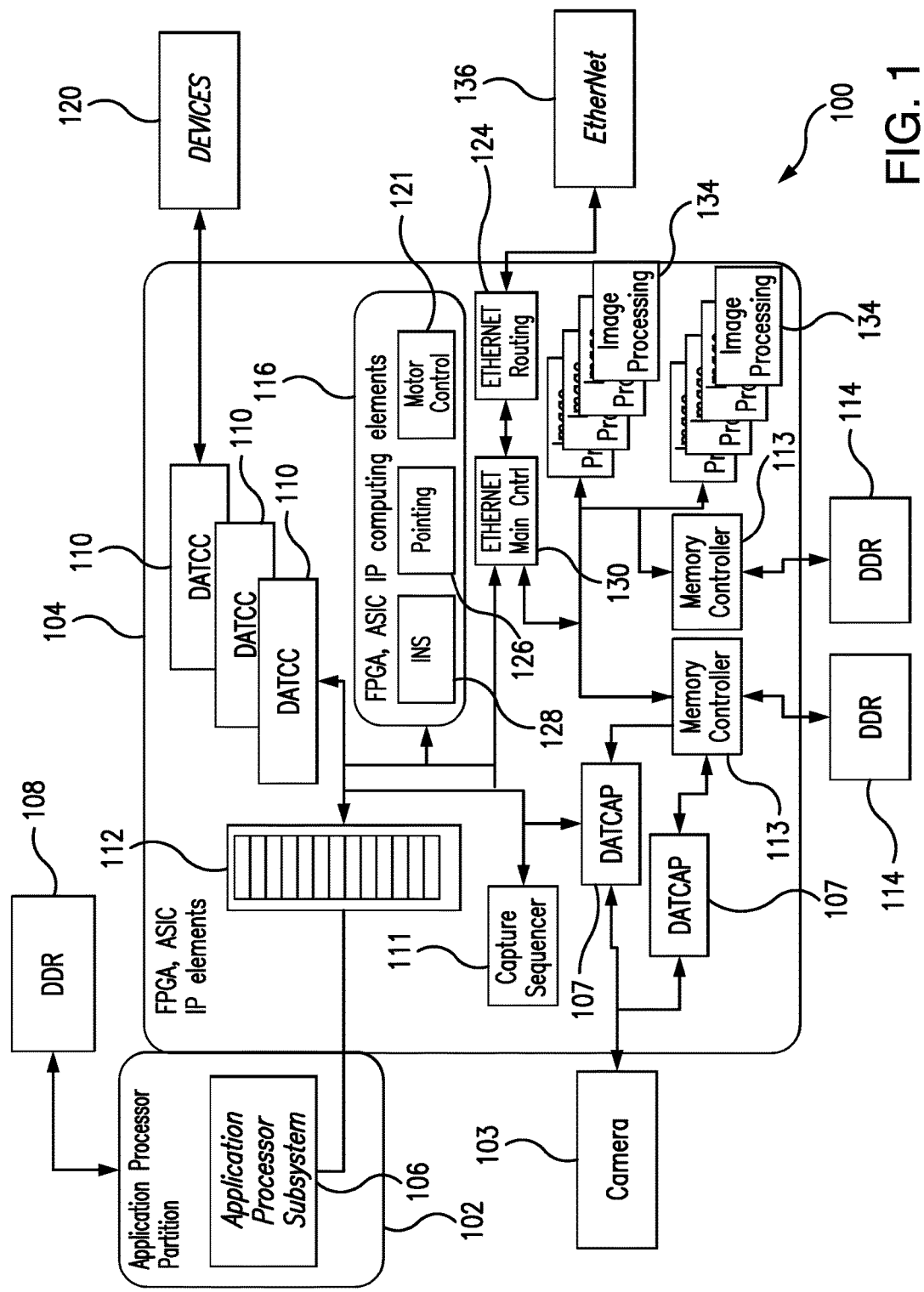
FIG. 1 is a system diagram illustrating a processing architecture which includes a plurality of heterogeneous co-processors configured to acquire state vector data and to receive a plurality of streams of input data and a plurality of hardware processing units configured to concurrently perform calculations related to the input data in accordance with an embodiment of the present invention.

It is to be appreciated that the below described embodiments are not limited in any way to what is shown in the Figures, and instead, can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated the certain embodiments described herein are preferably utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, for download from a remote machine, etc.

As used herein, the term "mobile platform" may refer to any vehicle with or without an on-board human pilot. For example, mobile platform may include, but are not limited to, Unmanned Aerial Vehicles (UAVs), fixed-wing UAVs, rovers, walking robots, hovercraft, submersibles, and surface vehicles. The term "mobile platform" is also intended to refer to any portable electronic device such as a cellular telephone, smart phone, tablet computer, or other wireless communication device, personal communication system (PCS) device, personal navigation device (PND), Personal Information Manager (PIM), Personal Digital Assistant (PDA), or other suitable mobile device. The term "mobile platform" may also include devices that communicate with the platform processing engine, such as by short-range wireless, infrared, wireline connection, or other connection—regardless of whether satellite signal reception, assistance data reception, and/or position-related processing occurs at the device or at the mobile platform. Any operable combination of the above are also considered a "mobile platform."

The term "device" is used herein in a broad sense and includes any type of sensor, including any type of camera and other kinds of image capture devices. The term sensor is also inclusive of multi-spectral imagers and groups or arrays of the same or different image capture devices. A sensor may capture information in a series of two or three dimensional arrays. The sensor may include both active and passive sensors.

As used herein, the term "processor" is to be broadly construed to include any type of embedded processor.

System on Chip (SOC) is now a commonly used concept; the basic approach is to integrate more and more functionality into a given device. SOC technology uses the increased capacity of modern integrated circuits to create separate functional elements, or Intellectual Property (IP) blocks, on the same semiconductor chip. The separate IP blocks are connected and interconnected to satisfy the designer's system-level requirements. Each IP block can be quite complex and can do substantial amounts of work both with and without predetermined cycle by cycle interaction off the SOC. The IP blocks can also simultaneously run several different software programs, some of which may interact with other IP blocks on the SOC, as well as with devices off the SOC. This integration can take the form of either hardware or solution software. Performance gains are traditionally achieved by increased clock rates and more advanced process nodes. Many SOC designs pair a microprocessor core, or multiple cores, with various peripheral devices and memory circuits.

The IP blocks on a modern SOC can include multiple processing cores (e.g., microcontrollers, central processing units, etc.), multiple memories (e.g., volatile and non-volatile, cache, etc.), multiple peripherals (e.g., DMA engines, interrupt controllers, interface units, timing circuits, etc.), and the like. The modern SOCs typically also contain the necessary interconnects between the IP blocks within the SOC, as well as from the IP blocks to off-chip connections.

A SOC described herein is an extension of a modern typical SOC implementation containing a modern multi-core processor and utilizing a commodity operating system. The SOC described herein comprises a heterogeneous multi-processor system that contains partitioned and shared memory resources. The disclosed heterogeneous coprocessing system is designed to distribute computation and the data needed to perform the calculations. The data is moved in the system in a very specific way amongst a plurality of memory components to avoid conflicted access to reflections of main memory typically encountered in traditional single memory multiprocessor systems. Various embodiments of the present invention utilize a set of image processing elements (IP blocks) that are instantiated in the SOC. Embodiments of the present invention contemplate that a plurality of co-processing elements packages data from the streaming data inputs along with relevant meta data to create memory access efficient data items used later (latently) by pipelined image processing elements. Various embodiments of the present invention are described below in connection with a typical machine vision system. However, SOC described herein can be utilized in any embedded control system and/or any embedded parallel processing system.

Typical machine vision systems include pluralities of computing elements, operating systems, physical sensors (i.e., image forming sensors, gyros, accelerometers, GPS), application software and actuation controllers. In a nutshell, a machine vision system works by querying the physical sensors at defined intervals, decoding the sensor feedback, estimating where in space the system is and where it is pointing, synchronizing the capture of the image forming data and collecting all of this information in digital memory. Typically, one or more application components perform each step of this data collection. Then the application software typically runs complex routines that take the image and physical sensor data to create an output. Additionally, the active control elements of a vision system mounted on a mobile platform typically need to react to real world disturbances as detected by the wide modality of sensors. These machine vision systems are challenged by deterministic behavioral needs exhibited by various components of a distributed system. The distributed nature of the system presents several challenges. Typically, there is a digital controller in the system that collects the sensor information and determines how to respond to this information contingent on the tasks the system intends to perform. Additionally, the machine vision system can have a plurality of electro-mechanical actuators that need to be controlled.

Referring now to FIG. 1, there is illustrated a processing architecture which includes a plurality of co-processors configured to acquire state vector data and to receive a plurality of streams of input data and a plurality of hardware processing units configured to concurrently perform calculations related to the input data in accordance with an embodiment of the present invention. In one embodiment, the SOC shown in FIG. 1 may be an integral part of a machine vision system 100 mounted on a mobile platform. Such machine vision system may comprise a multiple processor heterogeneous processing system which includes logical partitions that have respective processor cores and memory areas.

In several embodiments, the processing circuitry shown in FIG. 1 is implemented using programmable logic components (e.g. field programmable gate array (FPGA), complex programmable logic device (CPLD) or the like). In another embodiment, machine vision processing circuitry 100 is implemented using any number of discrete logic components. In yet another embodiment, machine vision processing circuitry 100 is implemented using an application specific integrated circuit (ASIC).

System 100 illustrated in FIG. 1 includes an application processor logical partition 102 having a computing device's application processor(s) 106 with a separate memory 108 and a SOC 104 having one or more customized co-processors and a plurality of devices 103 and 120 attached to SOC 104. Logical partitioning divides hardware resources so that specific cores, memory areas and I/O ports are allocated to the different partitions. The multi-core processor system 106 may run application codes in the same operating system (OS) and may be scheduled to run a code in parallel, symmetrical multi-processing mode (SMP). In the architecture illustrated in FIG. 1 application processor subsystem 106 is primarily responsible for executing one or more applications using its own memory space 108.

It is noted that devices 120 (i.e., sensors) collect variety of data related to the mobile platform. In one embodiment, the position, velocity, and angular orientation of the mobile platform may collectively be referred to as state vector parameters. According to an embodiment of the present invention, the state vector parameters are stored in state vector module 112 comprising a protected and managed read-write memory having a plurality of addressable memory locations. In one implementation, state vector module 112 is situated in the reconfigurable memory fabric shared by all elements in the co-processor logical partition 104. State vector memory 112 implemented as protected and managed multi port random access memory ("RAM") enables concurrent processing from the complete set of processors implemented in a particular mobile platform system. Advantageously, state vector module 112 further includes state management logic to perform state vector management operations for the acquired inertial and positional data. According to an embodiment of the present invention, the state management logic coordinates sharing and updating the acquired inertial and positional data in a concurrent fashion between application processor subsystem 106 and one or more co-processors described below.

In accordance with an embodiment of the present invention, SOC 104 also includes a customized DATa Collection and Control (DATCC) co-processor 110 designed to offload data movement tasks and interrupt handling tasks from the application processor 106. In one embodiment, DATCC co-processor 110 executes specific microcode instructions contained in a particular DATCC program. While only three DATCC co-processor components 110 are shown in FIG. 1 for ease of illustration, alternative embodiments are contemplated in which any number and combination of DATCC co-processors 110 can be utilized. This number is of course limited by the size and layout of the integrated circuit used in machine vision processing system 100. For example, such machine vision processing system on a mobile platform 100 may include more than 10 DATCC co-processors 110 instantiated on a single chip.

In accordance with an embodiment of the present invention, plurality of devices 120 may be connected to one or more SOCs 104, via a plurality of interfaces. In various embodiments, devices 120 may provide and receive digital communication, provide and receive serial communication, provide analog input that needs to be converted to digital format, receive analog output that has been converted from digital format, provide temperature readings, and the like. In one exemplary embodiment, the plurality of interfaces may include a bit level interface, standard peripheral interface and enhanced peripheral interface.

Examples of well-known in the art standard peripheral interfaces may include, but are not limited to, Rs 485, LVDS, and the like.

At least some of devices 120 may utilize an enhanced peripheral interface. This type of serial communication is typically modest (10's of Mbits) speed, low power and may be converted to the device specific interface at a particular device 120. Enhanced peripheral interfaces typically allow minimizing pin count and power consumption.

Still referring to FIG. 1, SOC 104 further includes another set of co-processors 107 and another plurality of devices 103 attached thereto. In a number of embodiments, a second plurality of devices 103 such as cameras 103, LIDARs, and the like may be configured to transmit high-bandwidth machine vision image data via an interface format. The captured image data is transmitted in accordance with the interface format as a packet. These packets can be adapted to accord with any interface format, including but not limited to the Mobile Industry Processor Interface Alliance (MIPI) CSI-2 interface format (MIPI interface format), CameraLink interface format, a USB interface format, or a Firewire interface format.

In accordance with an embodiment of the present invention, second set of co-processors 107, referred to hereinafter as DATCAP co-processors, configured and operational to perform ingestion of high-bandwidth machine vision data in a substantially standard manner. In an embodiment, DATCAP co-processor 107 is coupled with state vector memory 112 and integrated with the state management logic described above. In some embodiments, image data received from the devices 103 may be converted by a bit-level interface into appropriate format. In several embodiments, image data from the plurality of cameras 103 can be packetized by DATCAP 107 by inserting the image data and/or additional data describing the image data into a packet in such a way that application processor 106 and the processing coprocessors 134 can process images of a scene from the received image data and utilize additional system information related to the reconstructed images. This process of insertion of additional data (i.e., state vector data) describing the image data transmitted by cameras 103 is referred to hereinafter as metatagging. The image is typically rectangular and has four corners and corresponds to an image space. Examples of state vector data inserted by DATCAP 107 include, without limitation, earth coordinate positions of a location at which the image was taken, data indicating the geo-location coordinates for the points in the ground space corresponding to the four corners of the image and one or more timestamps (e.g., timestamps from GPS, timestamps from the machine vision system) indicating when an image was taken (e.g., date and time), information indicating whether the mobile platform was accurately stabilized at the time the image was taken, any detected error conditions, and the like.

It is noted that metatagging performed by DATCAP co-processor 107 rather than by application processor 106 makes the process highly accurate. Furthermore, embodiments of this invention provide a way to segment a plurality of streams of input data (i.e., machine vision data) into data segments convenient for processing and storage in the external memory, as described below. In one embodiment, the information inserted by code running on DATCAP co-processor 107 include data that may be used to provide additional information for an image/data processing function later in the processing pipeline in a parallel fashion. In one embodiment, DATCAP co-processor 107 may achieve this by copying the needed metatags into the data stream of image data and allowing for data localization needed for parallel processing. The size of the metatag data and a scratch buffer are added to the image data "line". The scratch buffer maybe filled in later image processing steps.

Still referring to FIG. 1, it is noted that the size of the data flow (i.e., video, LIDAR, camera data) ingested by several complex DATCAP co-processors 107 precludes the use of the state vector multiport memory for storage due to technical limitations. According to an embodiment of the present invention, to preserve the timing information and image data alignment with this high rate data, DATCAP co-processors 107 utilize a multi-bank DDR DRAM. Various embodiments of the present invention utilize separate DDR banks 114. Furthermore, DATCAP co-processors 107 may utilize on chip memory elements, such as memory controllers 113 that enable complex mathematical manipulation (routing) of this large size ingested data in a power efficient, deterministic manner. In an embodiment of the present invention, memory controllers 113 are configured to schedule access to a variety of DDR banks 114. This type of arrangement allows DATCAP co-processor(s) 107 to stream data to DDR banks 114 substantially without any involvement of application processor 106. As previously noted, DATCAP co-processors 107 also have access to the state vector memory 112. As previously indicated, in some embodiments, the hardware arrangement illustrated in FIG. 1 enables DATCAP co-processors 107 to synchronize machine vision data (i.e., image data) deterministically with the state vector 112 and store this synchronized data deterministically to DDR banks 114. Furthermore, DATCAP co-processors 107 offload metatagging and data capture and movement tasks from application processor 106, thus relieving application processor's 106 workload and bandwidth.

According to an embodiment of the present invention, DATCAP co-processors 107 may be communicatively coupled to capture sequencer component 111. The capture sequencer component 111 may be configured to sequence the image data based at least in part on state vector 112 values and/or other control signals (i.e., control signals provided by the state vector component 112).

Advantageously, in some embodiments, the state vector management logic of the SOC 104 is constructed in a customized memory implementation and has defined, deterministic performance with respect to update and query of data contained in state vector memory 112. In one embodiment, DATCAP co-processors 107 place state vector data into system's state vector memory 112 using safe/non-blocking memory asserts. Advantageously, in some embodiments, state vector memory 112 is designed to be both multi-ported and non-blocking. Consistency of the state vector is defined by an immutable copy of the state vector data that is not corrupted by the parallel update mechanisms during system use of each data element. Consistency means that all system elements have access to the same immutable copy of the state vector data simultaneously without blocking behavior. In other words, DATCAP co-processors 107 or any other component of SOC 104 can simply query the update value of any state vector location with consistent, deterministic performance. Furthermore, the illustrative embodiment depicted in FIG. 1 also places the device interface complexity into the customized SOC 104 thus freeing the application processor 106 from the computing it had previously done. As a result, application processor 106 no longer needs to handle interrupts related to various device interfaces. This greatly simplifies the programming model and simplifies the creation of robust device library (API) for all of the devices (sensors) on a mobile machine vision platform.

Memory controllers 113 depicted in FIG. 1 may comprise digital circuits that manage the flow of image data going between DDR banks 114 and DATCAP coprocessors 107, application processor 106, Ethernet router 124 and the image processing coprocessors 134. In various embodiments, memory controllers 113 enable data movement to various image processing components and/or enable direct storage of acquired vision data to DDR SRAM banks 114.

Furthermore, SOC 104 may further include embedded Ethernet traffic offload engine consisting of a routing element 124 and memory interface element (i.e., Ethernet memory controller 130) to the digital logic memory routing system 113. In the illustrated embodiment, Ethernet memory controller 130 is preferably configured to process requests from application processor 106 and/or other co-processing components related to moving data from DDR memory 114 throughout the Ethernet 136. In one embodiment, Ethernet router 124 instantiates SOC's 104 MAC address in hardware which enables SOC 104 to send high volume image data and state vector data to the Ethernet connection 136 without any involvement of application processor 106. It is noted that the depicted Ethernet traffic offload engine appears to application processor 106 and any external application as a standard pass through Ethernet socket.

Still referring to FIG. 1, SOC 104 may further include one or more co-processing components 116 configured to offload computational tasks from the application processor 106. In one embodiment the one or more co-processing components may include but are not limited to a motor control interface 121, pointing co-processing component 126 and Inertial Navigation Solution (INS) 128 component.

The purpose of an INS component 128 is to compute and provide a navigation solution to a machine vision mobile platform on which it is installed. A navigation solution consists of the Position, Velocity and Attitude (PVA) and Pose (Roll, Pitch Yaw) of the platform with respect to the Earth. INS component 128 computes a navigation solution based on the dead-reckoning and kalman filter principles: given the initial position, velocity and altitude of the mobile platform (referred to as "initial conditions"), continuous readings from the devices (i.e., sensors and GPS devices) 120 of the platform are used to keep an updated navigation solution even and particularly when the platform is in a dynamical state. As shown in FIG. 1, INS component 128 preferably is directly coupled to state vector memory 112 and may utilize the state vector memory 112 as an input and output buffer interface.

In accordance with an embodiment of the present invention, motor control interface 121 is disposed on SOC 104 and in communication with the plurality of devices 120 and state vector memory 112. Motor control interface 121 may ingest both positional and motor state data directly into the state vector memory 112. Motor control interface 121 may also be configured to route motor signaling to other motor control components via either direct and rapid bitmapping and/or via a serialization stream. Advantageously, various embodiments of the present invention contemplate that motor control interface 121 preferably ingests the sensor data directly, converts the ingested data into an appropriate format, calculates velocity, acceleration and altitude of the mobile platform and stores the calculated data in the state vector memory 112. In addition, simultaneously, motor control interface 121 may retransmit the acquired sensor data to another component of the mobile machine vision system 100.

In one embodiment, pointing co-processing component 126 may be configured to calculate point trajectories utilized by the motor control interface 121. Point trajectories are needed whenever positioning data builds on long term motion analysis. It is noted that, just like motor control interface 121, pointing co-processing component 126 utilizes state vector memory 112 for storing generated data.

Furthermore, as shown in FIG. 1, SOC includes a plurality of embedded hardware processing units 134 configured to concurrently perform computation intensive functions that depend on values stored in state vector memory 112. In various embodiments, hardware processing units 134 may be implemented as an array of discrete programmable logic components (e.g. FPGA, CPLD, ASIC or the like). The hardware processing units 134 are part of a complete modular processing architecture.

Figure 2:
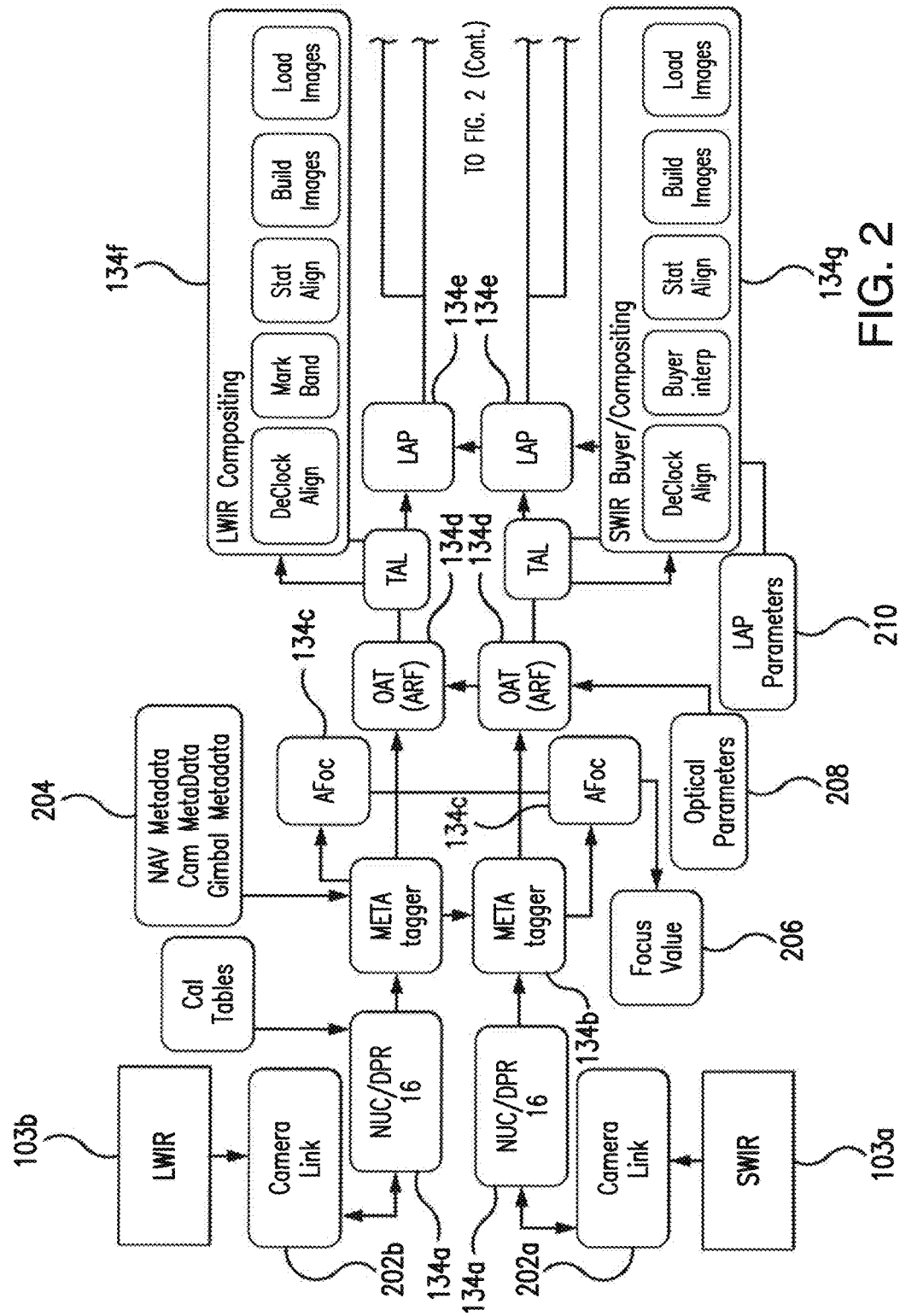
FIG. 2 is a system diagram illustrating the workflow of the plurality of hardware processing units of FIG. 1 in accordance with an embodiment of the present invention.
Figure 2:
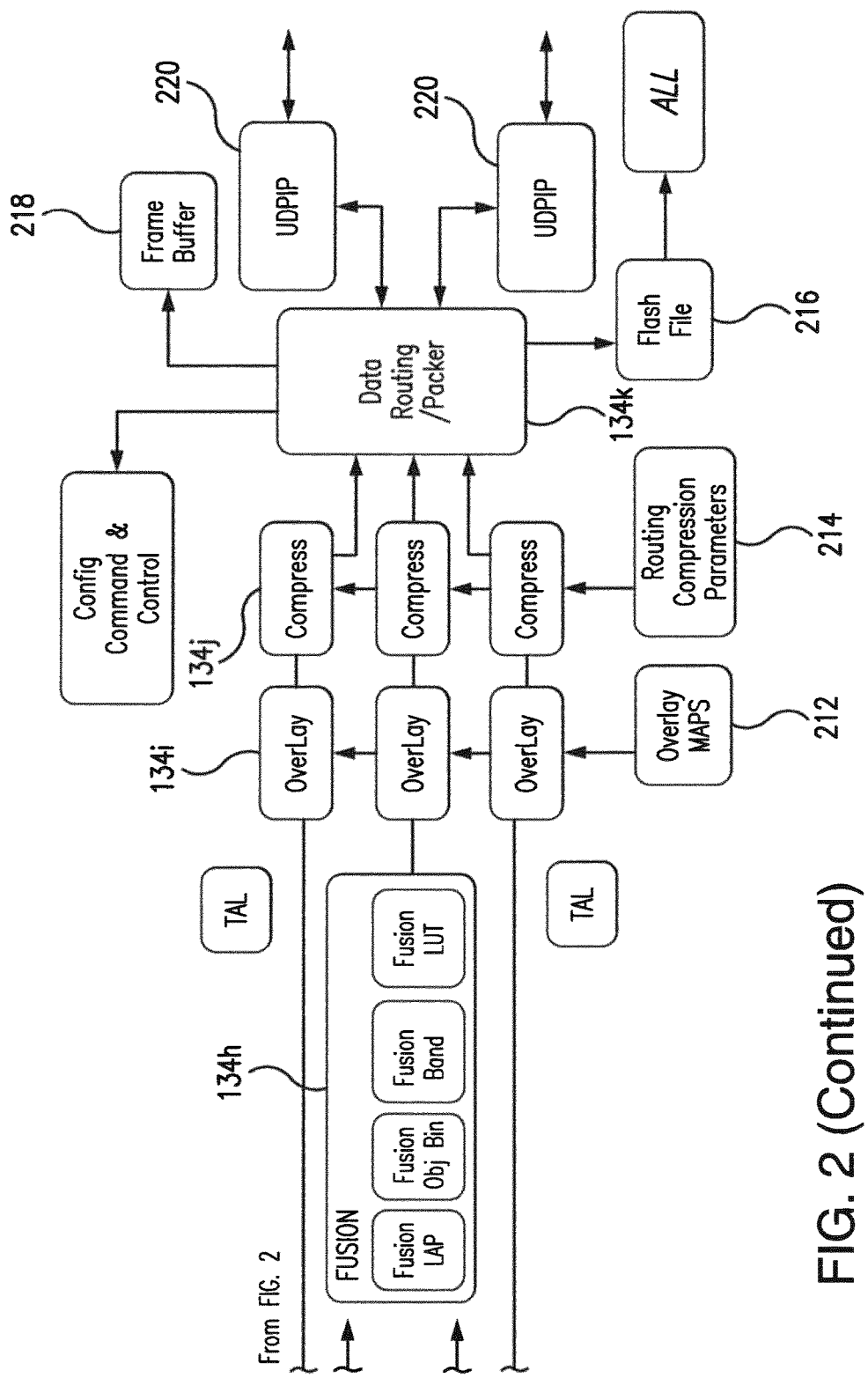

FIG. 2 is a system diagram illustrating the workflow of the plurality of hardware processing units of FIG. 1 in accordance with an embodiment of the present invention. Continuing with the machine vision example, in one embodiment, the hardware processing units 134 may be configured to generate a 3D model of the coverage area observed by cameras 103. For example, hardware processing units 134 may receive a plurality of data segments corresponding to a stream of input data (i.e., image data provided by cameras 103) and concurrently calculate x,y,z coordinates for every pixel included in each data segment. Hardware processing units 134 perform such calculation based at least upon some state vector parameters including, but not limited to, coordinates of the observation point's (e.g., camera's 103) position, direction to which the observation point points to, etc. It is noted that in various embodiments state vector parameters may be exactly the same, overlapping or non-overlapping. Further calculations may include, for example, finding intersection of two line segments. As previously noted, DATCAP co-processors 107 segment a plurality of streams of input data (i.e., machine vision data) into data segments, referred to hereinafter as strides, convenient for processing and storage in the external memory. Furthermore, DATCAP co-processors 107 also insert relevant state vector parameters into each stride.

FIG. 2 further illustrates exemplary image processing steps performed by hardware processing units 134. Although particular components are referenced in relation to particular blocks of FIG. 2, any appropriate components may be used, such as the various components described herein. In this embodiment, the set of imaging sensors 103 comprises a short-wave infrared (SWIR) camera 103a and a long-wave infrared (LWIR) camera 103b. In this embodiment, the SWIR camera 103a is arranged to capture a first image data stream, hereinafter referred to as the SWIR image stream and LWIR camera 103b is arranged to capture a second image data stream, hereinafter referred to as the LWIR image stream. The digital signals corresponding to the SWIR image stream and LWIR image stream are inputted into the hardware processing units 134. For example, the interface 202a-202b between the cameras 103a-b and DATCAP co-processors 107 can be a digital communication link such as the "Camera Link" standard.

In one embodiment, each hardware processing unit 134 is pre-programmed to perform a particular operation based on its function. For instance, unit 134a is configured to remove pixel value contributions associated with background noise and unit 134b is responsible for inserting additional data (i.e., state vector data) describing the SWIR image stream and LWIR image stream transmitted by cameras 103a-b. Next, various units, such as units 134c, can receive various segments of SWIR and LWIR images and determine camera parameters corresponding to cameras 103a and 103b such as focus, lighting, contrast, image relevance and so on. As shown in FIG. 2, this task can be performed in parallel by two or more hardware processing units 134c.

Next in the processing pipeline, units 134d may perform alignment correction to compensate for misalignment of cameras 103a-b and or other optical components providing input data to the system. In one embodiment, alignment correction units 134d integrate image segments from at least two image sources into a single, geometrically corrected, seamless composite image segment. After performing the alignment correction, the integrated SWIR and LWIR image segments are processed, respectively, by the SWIR compositing module 134f and LWIR compositing module 134f to obtain a high resolution synthesized image from low resolution image segments. In other words, according to some embodiments of the present invention, SWIR compositing module 134g and LWIR compositing module 134f provide the resolution recovery feature, such that the resolution in a processed image is recoverable, with access to certain information about the original image. In this context, recoverable can mean that there exists some algorithm through which the accuracy of the original image data which was provided in the image data stream can be reliably improved using a plurality of different images (e.g., different images taken from different angles). The synthesized image may then be fed to the local area processing (LAP) unit 134e to perform adaptive contrast adjustment of various entities based on their colors.

According to an embodiment of the present invention, the LWIR image is thereafter fused by the fusion module 134h with the SWIR image so as to form a hybrid image of the scene in the visible light range. As used herein, the visible light range corresponds to the range of wavelengths visible to the human eye, such as from about 390 to about 750 nm. It is noted that various pixel-level image fusion algorithms and feature-level image fusion algorithms known in the art may be utilized by the fusion module 134h to provide a high accuracy, minimal loss of information image. In one embodiment, fusion module 134h produces a full-color image having a high spatial resolution based on multi-spectral images with the spectral information stored in different bands.

Next, the fused images may be provided to an overlay unit 134i capable of overlaying additional information on an image stream. For example, various types of maps 212 may be overlaid on the image stream. The overlaid images may than be fed to a compression unit 134*j*. Image compression may reduce redundancy of the image data in order to decrease the amount of image information to be stored or transmitted. In one embodiment, compression unit 134*j* utilizes predefined routing compression parameters 214 and "lossless" (when the decompressed data exactly matches the original data) compression techniques. As shown in FIG. 2, compressed data may be passed to a data routing unit 134*k* responsible for transmitting compressed and packetized image streams to various components of the system using a variety of telecommunication protocols. In one embodiment, data routing unit 134*k* utilizes User Datagram Protocol/ Internet Protocol (UDP/IP) encapsulation 220. It is noted that data routing unit 134*k* may also transmit data to some local components such as, for example, but not limited to, flash file 216, frame buffer 218 and the like.

It is noted that at least some of the image processing pipeline steps described above are highly dependent on various configuration parameters 204-214 provided by application processor 106. Thus, hardware processing units 134 utilize different types of data to perform the required image processing computations. As would be anticipated, constantly retrieving the required data from external memory is not a resource efficient process since it would cause execution stalls.

Advantageously, in an embodiment of the present invention, DATCAP co-processor 107 is configured to segment the input data into a plurality of discrete strides. Each stride includes an element of input data stream and a subset of state vector data or any other data related to the element of input data stream.

Figure 3:
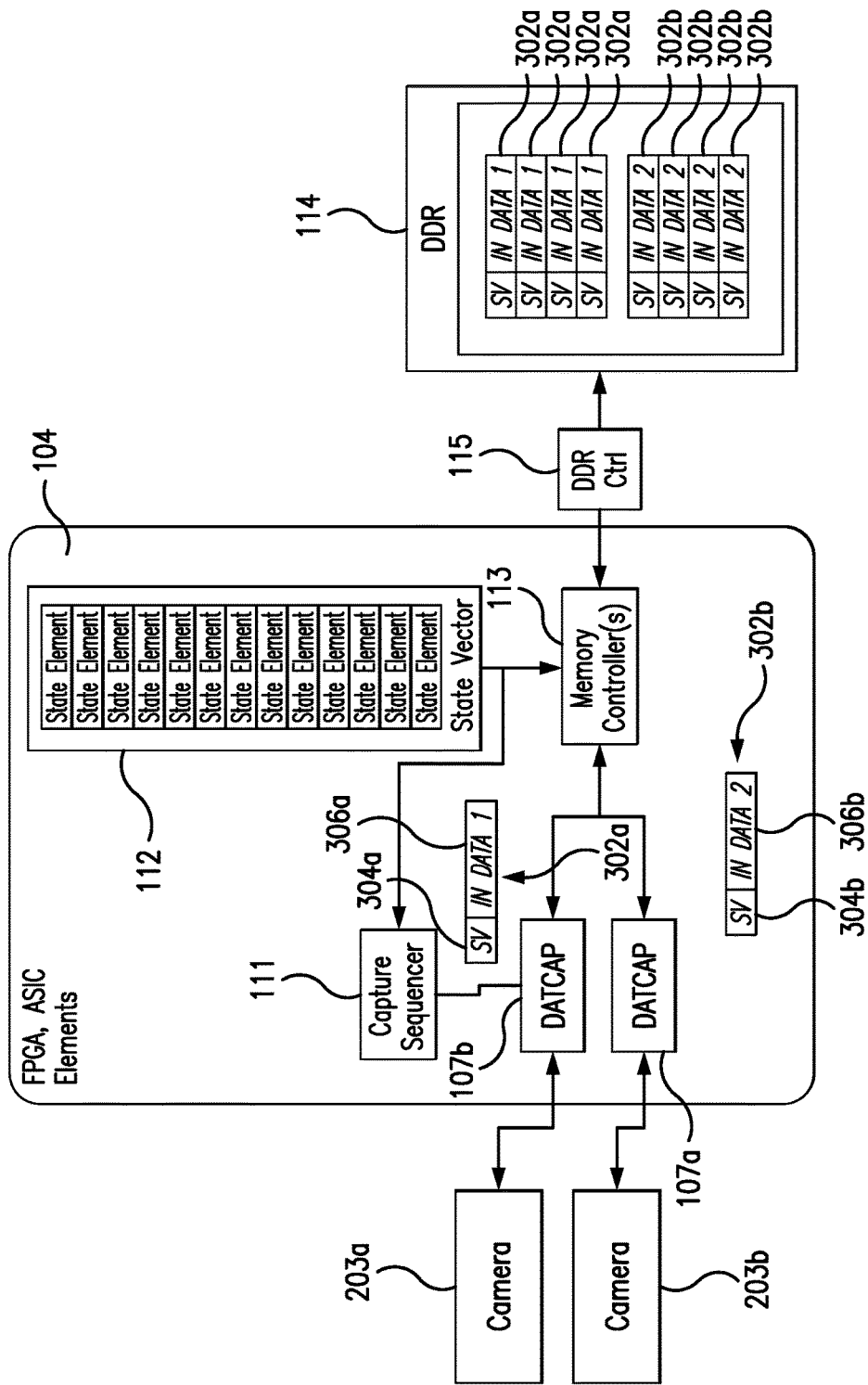
FIG. 3 is a system diagram illustrating how one memory controller can implement data capture with metatagging and memory efficient stride-sized blocks into one bank of an external memory via hardware design in accordance with an embodiment of the present invention.

FIG. 3 is a system diagram illustrating how one memory controller can implement data capture into one bank of an external memory via hardware design in accordance with an embodiment of the present invention. The general architecture is similar to that discussed with reference to FIG. 1 and common components will not therefore be described in detail. As shown in FIG. 3, two or more DATCAP co-processors 107*a-b* ingest input data (i.e., image data streams) received from the second plurality of devices (i.e., first camera 203*a* and second camera 203*b*). FIG. 3 further illustrates exemplary data strides a block of memory consisting of 302*a* and 302*b* generated by DATCAP co-processors 107. Each stride includes an element of input data stream and a subset of state vector data related to the element of input data stream. For example, first stride 302*a* is generated by first DATCAP co-processor 107*a* and includes an element 306*a* of first input data stream provided by first camera 203*a*. In addition, first stride 302*a* further includes state vector data 304*a* tagged to the input data element 306*a*, which may be retrieved by DATCAP co-processor 107 from state vector memory 112. Similarly, second stride 302*b* includes relevant state vector data 304*b* concatenated with the corresponding input data element 306*b*. In various embodiments, each element 304*a* and 304*b* may additionally include a scratch buffer for passing data between image processing steps. The size of the stride 304*a*, 304*b* should be sized to be efficient with regard to a DDR native read sizes.

Still referring to FIG. 3, two or more DATCAP co-processors are coupled to a memory controller 113 which is coupled to an external memory. In one embodiment, the memory controller 113 is connected to a DDR memory controller 115 and the memory may be a DDR synchronous DRAM memory 114. The memory controller 113 is a specialized hardware module configured to manage the flow of data to and from a DDR memory array 114 utilizing the DDR contoller 115. DDR memory controller 115 includes logic for interfacing with the DDR memory array 114, such as selecting a row and column corresponding to a memory location, reading or writing data to the memory location, etc. Advantageously, as shown in FIG. 3, memory controller 113 is further configured to store at each memory location a particular data stride provided by DATCAP co-processor 107. In an embodiment of the present invention, a stride size is substantially equal to integer multiples of DDR memory block size for efficiency purposes. In other embodiments, the size of the stride can be adjusted based on input data rates, co-processing requirements and input data codependency. For example, to improve efficiency of image processing pipeline illustrated in FIG. 2, a data stride may comprise a single row of pixels of a corresponding image.

Figure 4:
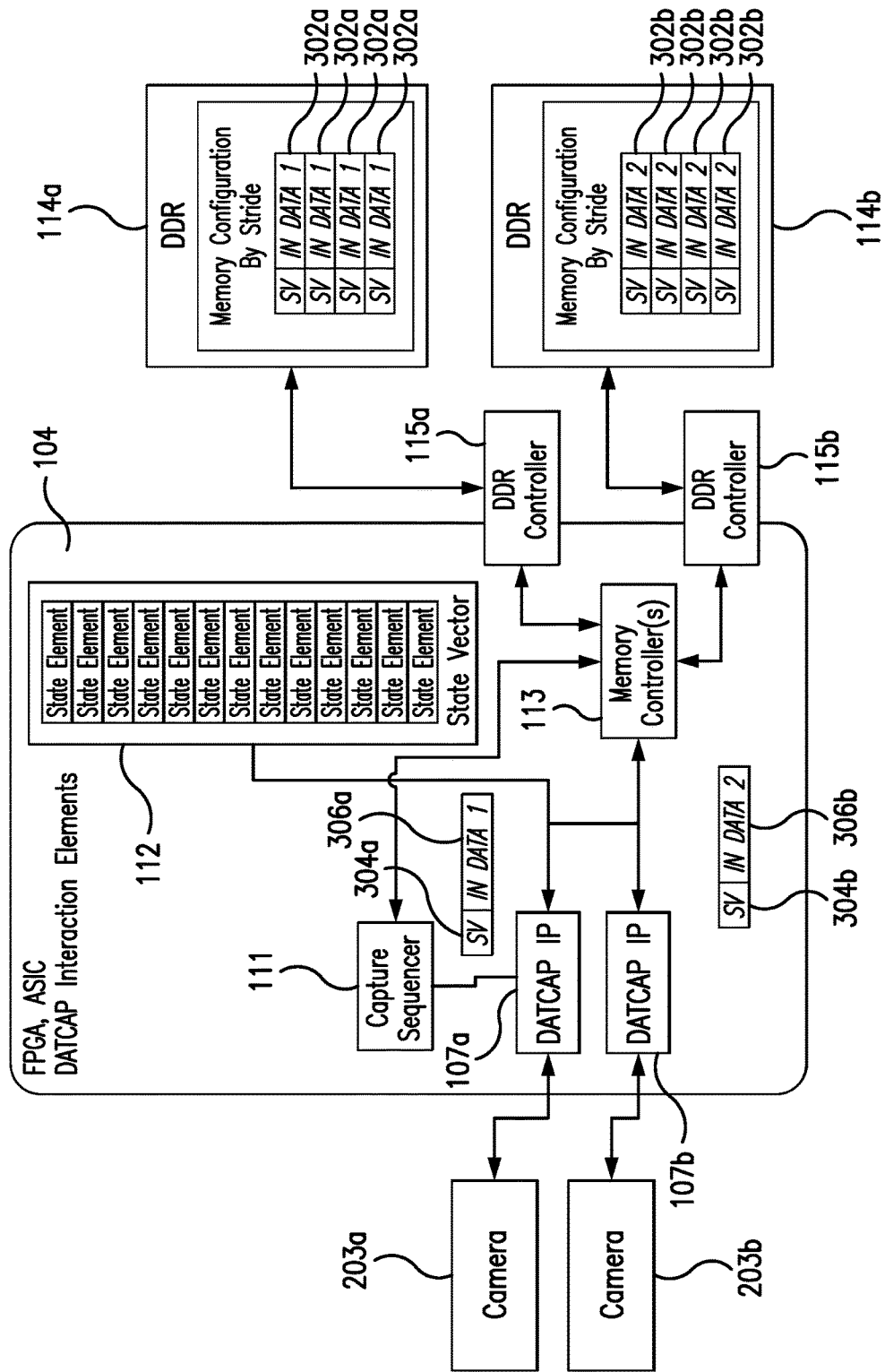
FIG. 4 is a system diagram illustrating how two memory controllers can implement data capture with metatagging and memory efficient stride-sized blocks into two distinct banks of an external memory via hardware design in accordance with an embodiment of the present invention.

FIG. 4 is a system diagram illustrating how two memory controllers can implement data capture into two distinct banks of an external memory via hardware design in accordance with an embodiment of the present invention. In this embodiment, first DATCAP co-processor 107*a*, configured to receive input data stream from a first camera 203*a*, is communicatively coupled to memory controller 113. The memory controller 113 then configures the routing of data from DATCAP 107*a* to the first DDR memory controller 115*a* configured to manage the flow of data to and from a first DDR memory array 114*a*. Furthermore, second DATCAP co-processor 107*b* is configured to receive input data stream from a second camera 203*b* and is communicatively coupled to a second DDR memory controller 115*b* via routing configured by memory controller 113. The second DDR memory controller 115*b* s configured to manage the flow of data to and from a second DDR memory array 114*b*. In other words, the architecture scheme illustrated in FIG. 4 provides a distinct memory array managed by a dedicated DDR memory controller 115*a*, 115*b* for each source of input data stream but data routing is controlled by memory controller 113.

Figure 5:
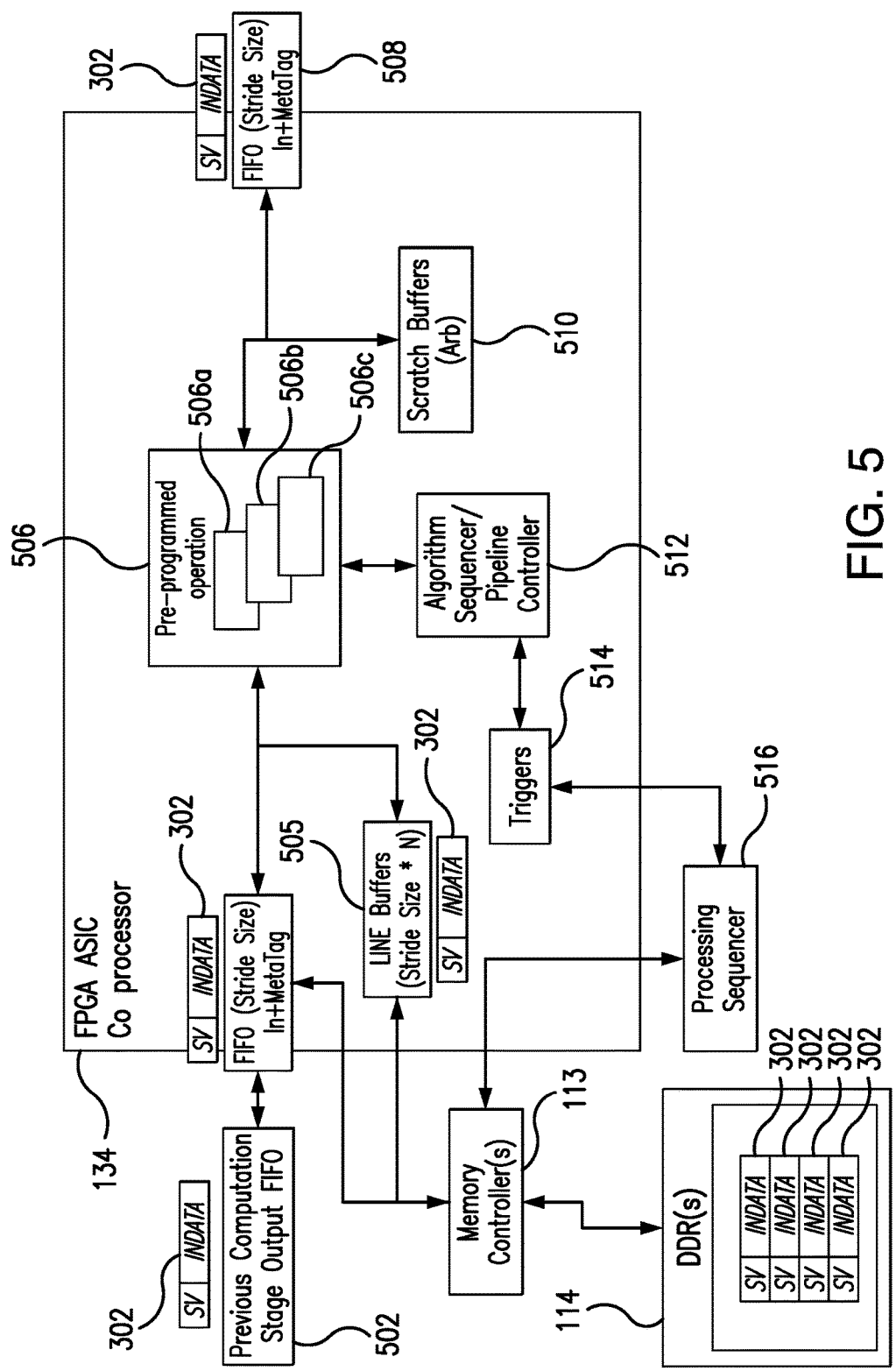
FIG. 5 is a system diagram illustrating an exemplary hardware processing unit having a plurality of cache elements and configured to communicate with an external memory via a memory controller in accordance with an embodiment of the present invention.

FIG. 5 is a system diagram illustrating an exemplary hardware processing unit having a plurality of cache elements (local memory elements) and configured to communicate with an external memory via a memory controller in accordance with an embodiment of the present invention. FIG. 5 illustrates exemplary implementation of hardware processing units 134 shown in FIGS. 1 and 2 as a distinct co-processor. As previously noted, each hardware processing unit 134 may be implemented using FPGA, CPLD, ASIC or the like.

As shown, in FIG. 5, each hardware processing unit 134 which is a part of the image processing pipeline illustrated in FIG. 2 receives input information in the form of a single stride 302. Such stride may include, for example, results of computations performed by hardware processing unit's 134 direct predecessors in the processing pipeline. For example, if hardware processing unit 134 represents alignment correction unit 134*d* shown in FIG. 2, the input data stride 302 represents camera parameter (i.e. focus) provided by unit 134*c*. In other words, according to an embodiment of the present invention, data strides are utilized by the hardware processing pipeline as an atomic data distribution unit.

It is noted that each hardware processing unit 134 is pre-programmed to perform a particular operation 506 based on its function. It is further noted that each pre-programmed operation may further include a plurality of steps 506 *a-c* that could be executed concurrently. For example, each step may comprise a mathematical operation such as an addition or subtraction.

In an embodiment of the present invention, hardware processing unit 134 may utilize a plurality of local data caching components situated therein. For example, hardware processing unit may utilize a filtering component 506 comprising a plurality of line buffers for spatial filtering purposes. It is noted that for some operations performed on a particular stride (i.e., line or raw of pixels) by hardware processing units 134 additional data corresponding to adjacent strides (rows of pixels) may be needed. This additional data is retrieved by memory controller 113 from DDR array 114. Additional programming and control logic allows filtering component 506 to pre-fetch data in anticipation of a processing operation. Such control logic may specify, for example, how many strides are to be built up in the plurality of line buffers prior to allowing processing to occur.

Various data caching components may further include scratch buffers 510, pipeline controller 512, processing triggers 514 and the like. These data caching components are part of a complete modular processing architecture. The pre-programmed operations logic contained in elements 506 operates against known local memory locations. These memory locations are filed with data via the tightly coordinated scripting of data from DDR using the memory control system 113. The input FIFO can be filled by the previous processing step or filled from memory via 113. The LineBuffer component 505 is filled from DDR via timing and administered by the memory controller 113. The Line buffer 505 is stride sized to simplify data alignment in between images and data streams while offering efficient DDR bandwidth utilization. The use of a scratch pad memory may be required by the specific mathematical operations performed by 506a,b,c. The scheduling mechanism of moving data in a pipelined fashion one stride at a time greatly helps and aligning off chip memory data to the data passing by in stride greatly conserves on chip memory but is more complicated as data is moved to and from the DDR in a tightly controlled manner. The DDR movement schedule is complex and deterministic to a degree. Thus the system adds signaling that receives triggers of data input signals and process completion steps and memory status signaling. In one embodiment the Processing Sequencer 516 requests that a memory location and size in in DDR be pushed to the processing steps line buffer 505. The memory controller 113 signals that the line buffer set 5056 for a process is updated to the Process sequencer 516 which in turn sets a trigger flag in the trigger memory 514. As data is written to the input fifo 508 a similar trigger will fire in 514. The Algorithm sequencer 512 then makes a typically simple determination, using logic as follows, if the line buffer data is present and the fifo 508 is full and steps 506a is ready then calculate 506a. Operation 506a might store a result in the scratch buffer 510 and signal completion to the algorithm sequencer 512. Sequencer 512 then applies logic if step 506a is complete to run step 506b using scratch buffer 510.

As shown in FIG. 5, processing results may be passed as on output 508 in the form of a stride 302 to a successive processing element in the processing pipeline and/or to DDR array 114. It is noted that SOC 100 includes at least one sequencer 516 (shown in FIG. 5) communicatively coupled to each of the plurality of hardware processing units 134 and to the memory controller 113. According to an embodiment of the present invention sequencer 516 is configured to control the calculations performed by the plurality of the hardware processing units 134.

Figure 6:
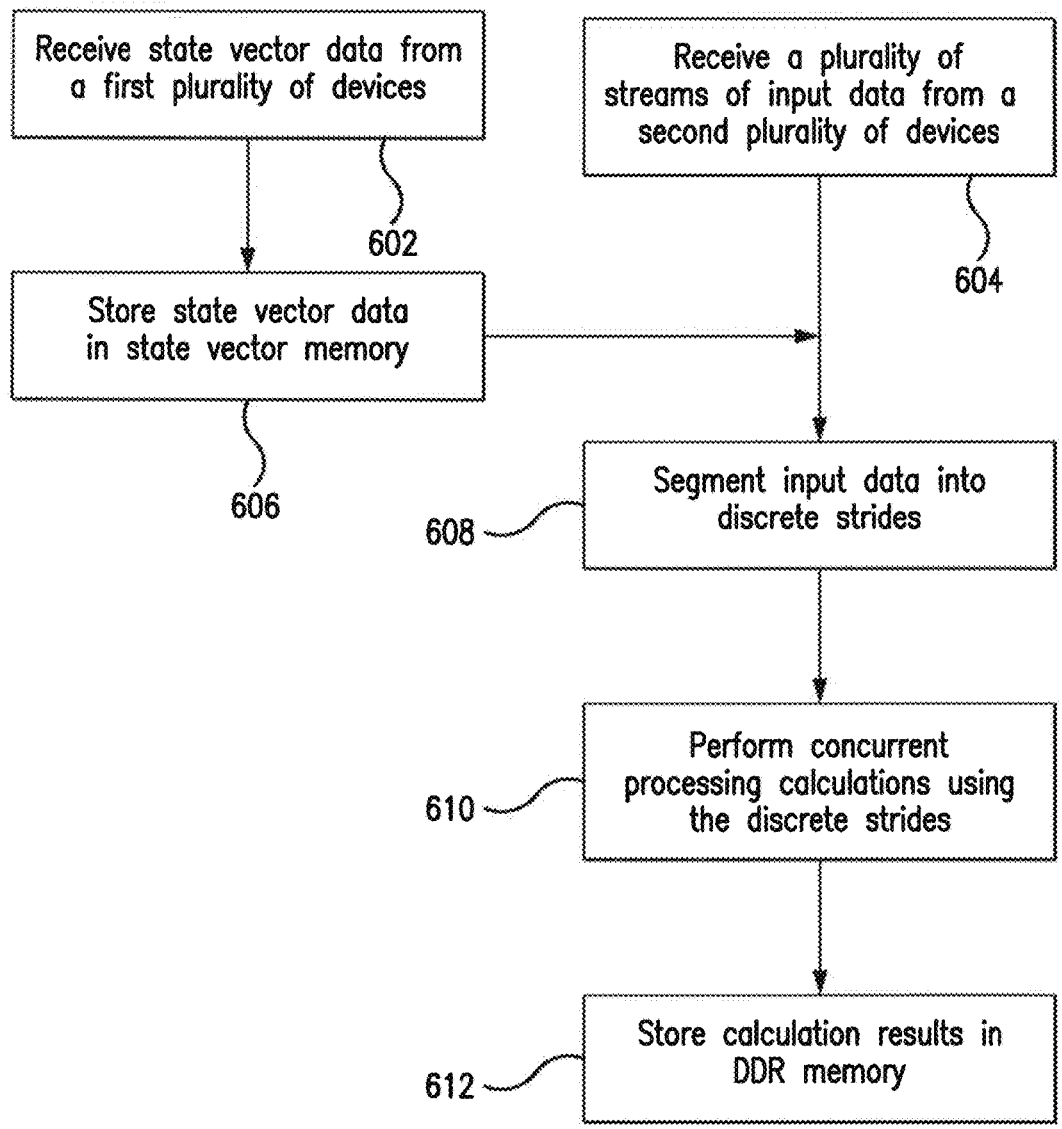
FIG. 6 is a flowchart of operational steps for concurrent processing of streams of input data in accordance with illustrative embodiments of the present invention.

FIG. 6 is a flowchart of operational steps for concurrent processing of streams of input data in accordance with illustrative embodiments of the present invention. At step 602, one or more DATCC co-processors 110 periodically receive state vector data (i.e, position, velocity, angular orientation) from a first plurality of devices (sensors) as described above in conjunction with FIG. 1. At step 606, DATCC co-processors 110 store the received data in state vector memory 112 comprising a plurality of addressable memory locations. In one embodiment, DATCC co-processors 110 may utilize a state vector memory interface configured to manage the flow of data to and from state vector memory 112.

At step 604, one or more DATCAP co-processors 107 receive streams of input data, such as image data, from the second plurality of devices, such as cameras, LIDARs and the like. It is noted that steps 602 and 604 are performed by respective co-processors substantially concurrently. Next, at step 608, DATCAP co-processors 107 segment input data into a plurality of conveniently sized data segments referred to herein as strides which are used by the SOC 100 for data calculation, data distribution and data storage purposes. Furthermore, at step 608, DATCAP co-processor 107 tags each stride with the relevant state vector information.

At step 610, a plurality of hardware processing units 134 arranged on the same chip with one or more DATCC co-processors 110 and one or more DATCAP co-processors 107 concurrently perform a variety of input data processing operations, such as image processing operations described above, using the plurality of strides generated by DATCAP co-processor. In some embodiments, at step 612, the plurality of hardware processing units 134 may store the processed results for at least some operations in the external memory, such as DDR memory blocks 114.

While various embodiments described above are directed to a machine vision system attached to a mobile platform, these embodiments are also applicable to various kinds of multi-processor parallel-processing systems. The architectural design disclosed herein is modular and parametric allowing rapid re-scaling. Advantageously, in an embodiment, the processing hardware is capable of operating randomly on the set of data blocks without any additional load on application processor. This novel feature is particularly useful for translating sequentially received data into randomly accessible data.

In summary, according to embodiments of the present invention, the packed (high locality) data and metadata data structures can be routed to a plurality of physically separate DDR banks of memory storage. The memory controller 113 and the processing sequencer 516 act in concert to move data from the DATCAP entities 107 to the large memory storage subsystem 114, and from this memory to the latent pipelined processing elements 134, and/or Ethernet I?O 130. This allocation of function removes memory movement from application processor 106, limits each churn on app processor 106 and limits interrupts. The highly controlled scheduling and tight packaging of image data and metadata and use of small local memories to pipeline data from one process step to the next creates very high computational throughput and high parallelization of computation.

The techniques described herein are exemplary, and should not be construed as implying any particular limitation of the certain illustrated embodiments. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A multi-processor computer system with shared memory resources, the computer system comprising:
   a first plurality of sensors configured to acquire inertial and positional data related to a mobile platform;
   a first plurality of co-processors communicatively coupled to the first plurality of sensors, the first plurality of co-processors including a hardware logic configured to control the acquisition of the inertial and positional data and configured to analyze the acquired inertial and positional data;
   a second plurality of sensors configured to acquire input data related to the mobile platform;
   a second plurality of co-processors communicatively coupled to the second plurality of sensors, the second plurality of co-processors including a hardware logic configured to receive a plurality of streams of input data from the second plurality of sensors and configured to segment the input data into a plurality of discrete data segments, wherein each data segment includes an element of input data stream and a subset of the inertial and positional data related to the element of input data stream, wherein the data segment comprises a stride and wherein each stride comprises an element of the input data and a subset of the inertial and positional data related to the element of input data stream;
   at least one array of Double Data Rate (DDR) memory blocks and a memory controller communicatively coupled to the at least one array of DDR memory blocks and the plurality of hardware processing units, the memory controller configured to store and retrieve the plurality of strides in/from the at least one array of DDR memory blocks; and
   a plurality of hardware processing units configured to perform calculations related to the input data using the plurality of data segments.

2. The multi-processor computer system of claim 1, wherein the input data comprises image data and wherein the performed calculations comprise image processing calculations.

3. The multi-processor computer system of claim 2, further comprising an embedded Ethernet packet routing controller.

4. The multi-processor computer system of claim 1, wherein each of the plurality of hardware processing units comprises at least one of an Application Specific Integrated Circuit (ASIC) and a Field Programmable Gate Array (FPGA).

5. The multi-processor computer system of claim 1, wherein a stride size is substantially equal to integer multiples of DDR memory block size.

6. The multi-processor computer system of claim 1, further comprising a state vector memory comprising a plurality of addressable memory locations and a state vector memory management interface communicatively coupled to the state vector memory and the first and second co-processors, the state vector management interface configured to provide read and write control to the state vector memory.

7. The multi-processor computer system of claim 1, further comprising at least one sequencer communicatively coupled to each of the plurality of hardware processing units and to the memory controller, wherein the sequencer is configured to control the calculations performed by the plurality of the hardware processing units.

8. A method comprising:
   storing state vector data received from a first plurality of sensors in a state vector memory using a state vector component;
   receiving a plurality of streams of input data from a second plurality of sensors;
   segmenting the input data into a plurality of discrete data segments, wherein each data segment comprises a stride and wherein each stride includes an element of input data stream and a subset of state vector data related to the element of input data stream;
   performing concurrent calculations related to the input data using the plurality of data segments; and
   storing results of the performed calculations in at least one array of Double Data Rate (DDR) memory blocks as a plurality of strides, wherein a memory controller communicatively coupled to the at least one array of DDR memory blocks and a plurality of hardware processing units, the memory controller configured to store and retrieve the plurality of strides in/from the at least one array of DDR memory blocks.

9. The method of claim 8, wherein one memory block stores at least one stride.

10. The method claim 8, wherein the input data comprises image data and wherein the performed concurrent calculations comprise concurrent image processing calculations.

11. The method of claim 10, wherein the concurrent calculations are performed by a plurality of hardware processing units and wherein each of the plurality of hardware processing units comprises at least one of an Application Specific Integrated Circuit (ASIC) and a Field Programmable Gate Array (FPGA).

12. The method of claim 11, wherein each of the plurality of hardware processing units is pre-programmed to perform a particular image processing function.

* * * * *